(12) United States Patent
Lee et al.

(10) Patent No.: US 7,518,978 B2
(45) Date of Patent: *Apr. 14, 2009

(54) INFORMATION STORAGE MEDIUM AND METHOD AND SYSTEM FOR RECORDING DATA ON THE SAME

(75) Inventors: Kyung-geun Lee, Seongnam-si (KR); Wook-yeon Hwang, Yangpyung-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/432,394

(22) Filed: May 12, 2006

(65) Prior Publication Data
US 2006/0203664 A1    Sep. 14, 2006

Related U.S. Application Data

(63) Continuation of application No. 11/023,591, filed on Dec. 29, 2004.

(30) Foreign Application Priority Data

Feb. 28, 2004 (KR) ................................ 2004-13788

(51) Int. Cl.
   *G11B 7/24* (2006.01)
(52) U.S. Cl. ................................ 369/275.3; 369/275.1
(58) Field of Classification Search ........................ None
   See application file for complete search history.

(56) References Cited

U.S. PATENT DOCUMENTS

| | | | |
|---|---|---|---|
| 5,881,032 A | 3/1999 | Fukushima et al. | |
| 6,058,086 A * | 5/2000 | Yeo et al. | 369/53.21 |
| 6,072,759 A | 6/2000 | Maeda et al. | |
| 6,370,091 B1 * | 4/2002 | Kuroda | 369/30.08 |
| 2003/0063545 A1 * | 4/2003 | Suzuki | 369/59.25 |
| 2005/0030873 A1 | 2/2005 | Sasaki | |

FOREIGN PATENT DOCUMENTS

| | | |
|---|---|---|
| EP | 8 17 195 A2 | 1/1998 |
| EP | 1 176 586 | 1/2002 |
| JP | 09-69264 | 3/1997 |

(Continued)

OTHER PUBLICATIONS

U.S. Appl. No. 11/023,591, filed Dec. 29, 2004, Kyung-geun Lee et al, Samsung Electronics Co., Ltd.

(Continued)

*Primary Examiner*—William J Klimowicz
*Assistant Examiner*—Tawfik Goma
(74) *Attorney, Agent, or Firm*—Stein, McEwen & Bui, LLP (57) ABSTRACT

A recordable information storage medium having a plurality of information recording layers, where each of the information recording layers of the recordable information storage medium has a plurality of information recording layers each including a lead-in area, a user data area, a lead-out area, and a dedicated area for a drive. The amount of user data to be recorded is divided to allot the data area having the same capacity on each of the information recording layers.

13 Claims, 6 Drawing Sheets

FOREIGN PATENT DOCUMENTS

| | | |
|---|---|---|
| JP | 2000-67511 | 3/2000 |
| JP | 2004-310972 | 11/2004 |

OTHER PUBLICATIONS

U.S. Appl. No. 11/206,206, filed Aug. 18, 2005, Kyung-geun Lee et al, Samsung Electronics Co., Ltd.

U.S. Appl. No. 11/432,395, filed May 12, 2006, Kyung-geun Lee et al, Samsung Electronics Co., Ltd.

U.S. Appl. No. 11/432,392, filed May 12, 2006, Kyung-geun Lee et al, Samsung Electronics Co., Ltd.

First Office Action dated May 30, 2008 of the Taiwanese Patent Application No. 94104595.

* cited by examiner

INFORMATION STORAGE MEDIUM AND METHOD AND SYSTEM FOR RECORDING DATA ON THE SAME

CROSS-REFERENCE TO RELATED APPLICATIONS

This application is a continuation of application Ser. No. 11/023,591 filed Dec. 29, 2004, now pending, which claims the priority of Korean Patent Application No. 2004-13788, filed on Feb. 28, 2004 in the Korean Intellectual Property Office, the disclosure of which is incorporated herein in its entirety by reference.

BACKGROUND OF THE INVENTION

1. Field of the Invention

The present invention relates to an information storage medium and a method and a system recording data on the same, and more particularly, to an information storage medium, which includes a plurality of recording layers having a layout structure of a lead-in area, a lead-out area, and a user data area to improve a recording speed and recording performance, and a method and a system recording data on the same.

2. Description of the Related Art

In general, an information storage medium is used in relation to a non-contact type optical pickup device for recording/reproducing data. A type of optical disk as an example of the information storage medium is divided into a compact disk (CD) or a digital versatile disk (DVD) based on the information recording capacity. In addition, examples of an erasable optical disk include 650 MB CD-R, CD-RW, and 4.7 GB DVD+RW. Furthermore, an HD-DVD having a recording capacity of 20 GB is being developed.

In order to increase the recording capacity, a shorter wavelength is used as a recording light source, and the numerical aperture of an object lens is increased. In addition, a plurality of information recording layers is used. U.S. Pat. No. 5,881,032 issued on Mar. 9, 1999 discloses a DVD-ROM having a plurality of information recording layers.

Figure 1A:
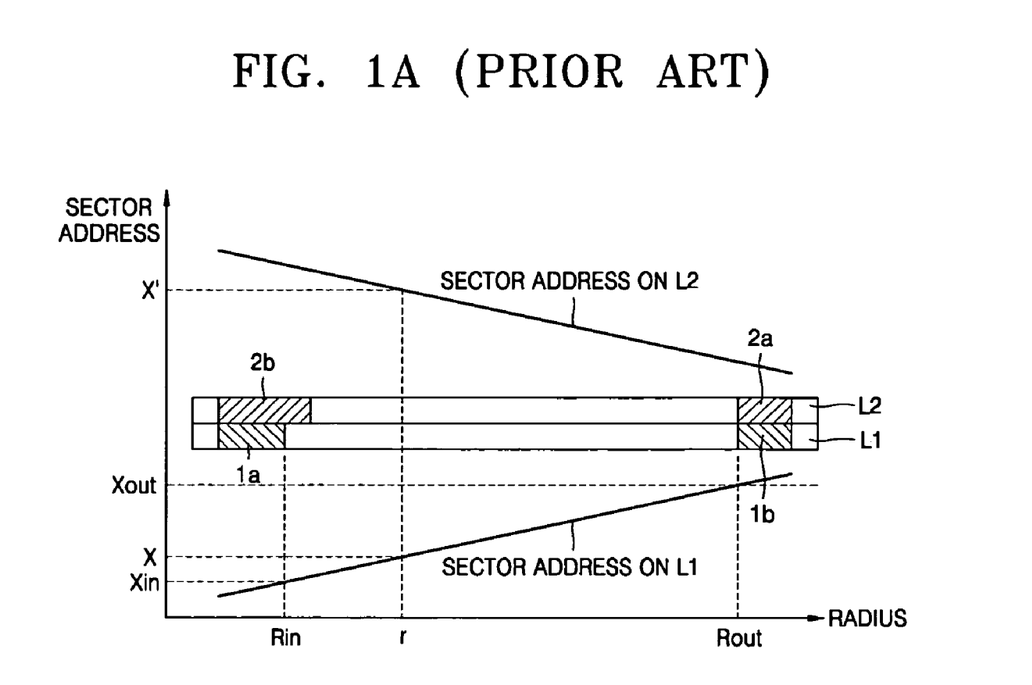
FIG. 1A illustrates a sector address structure of a conventional DVD-ROM double-layered optical disk.

A sector address structure of a disk having dual information recording layers is shown in FIG. 1A. The disk in FIG. 1A has a first information recording layer L1 and a second information recording layer L2 that have lead-in areas 1a and 2a and lead-out areas 1b and 2b, respectively. On the first information recording layer L1, a first sector address X is increased in a direction from an inner perimeter Rin of the disk to an outer perimeter Rout of the disk. On the second information recording layer L2, a second sector address X' is increased in a direction from the outer perimeter Rout to the inner perimeter Rin of the disk.

Figure 1B:
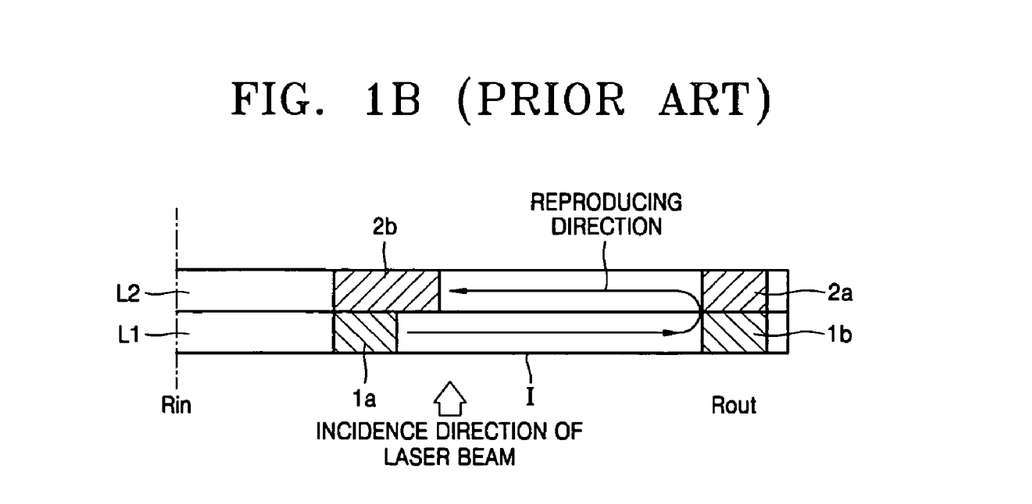
FIG. 1B illustrates the arrangement of lead-in areas and lead-out areas of a conventional DVD-ROM opposite track pack (OTP) dual-layered optical disk.

On the other hand, a multi-layered optical disk having more than two information recording layers can be divided into an opposite track path (OTP) and a parallel track path (PTP) based on directions of recording/reproducing data on/from the disk. The OTP reproduces data from the first information recording layer L1 in a direction from the inner perimeter Rin to the outer perimeter Rout and reproduces data from the second information recording layer L2 in a direction from the outer perimeter Rout to the inner perimeter Rin, as shown in FIG. 1B. In other words, the track spiral directions of the OTP optical disk are alternately formed on each of the information recording layers. In addition, FIG. 1C denotes an OTP multi-layered optical disk having first through fourth information recording layers L1, L2, L3, and L4. In the OTP multi-layered optical disk, first through fourth lead-in areas 1a, 2a, 3a, and 4a and first through fourth lead-out areas 1b, 2b, 3b, and 4b are alternately formed at the inner perimeter regions and the outer perimeter regions of the first through fourth information recording layers L1, L2, L3, and L4 of the disk, respectively. The data is reproduced from the first information recording layer L1 in the direction from the inner perimeter Rin to the outer perimeter Rout, from the second information recording layer L2 in the direction from the outer perimeter Rout to the inner perimeter Rin, from the third information recording layer L3 in the direction from the inner perimeter Rin to the outer perimeter Rout, and from the fourth information recording layer L4 in the direction from the outer perimeter Rout to the inner perimeter Rin.

Figure 2:
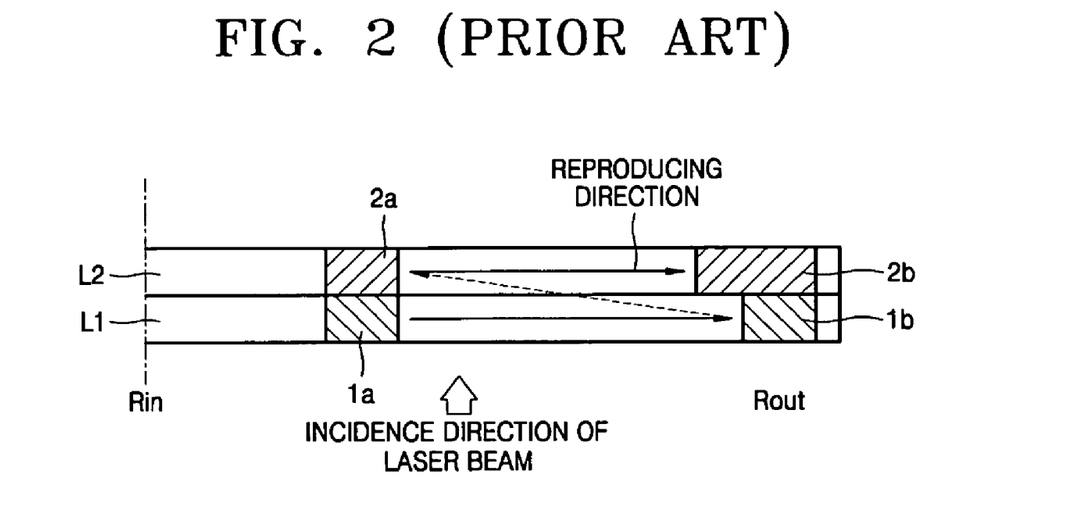
FIG. 2 illustrates the arrangement of lead-in areas and lead-out areas of a conventional DVD-ROM parallel track path (PTP) four-layered optical disk.

FIG. 2 denotes a PTP dual-layered optical disk having a first information recording layer L1 from which data is reproduced in a direction from an inner perimeter Rin to an outer perimeter Rout and a second information recording layer L2 from which data is reproduced in a direction from the inner perimeter Rin to the outer perimeter Rout. In other words, track spiral directions of the information recording layers are the same. A first lead-in area 1a is formed at the inner perimeter portion of the first information recording layer L1, a first lead-out area 1b is formed at the outer perimeter portion of the first information recording layer L1, a second lead-in area 2a is formed at the inner perimeter portion of the second information recording layer L2, and a second lead-out area 2b is formed at the outer perimeter portion of the second information recording layer L2.

Figure 1C:
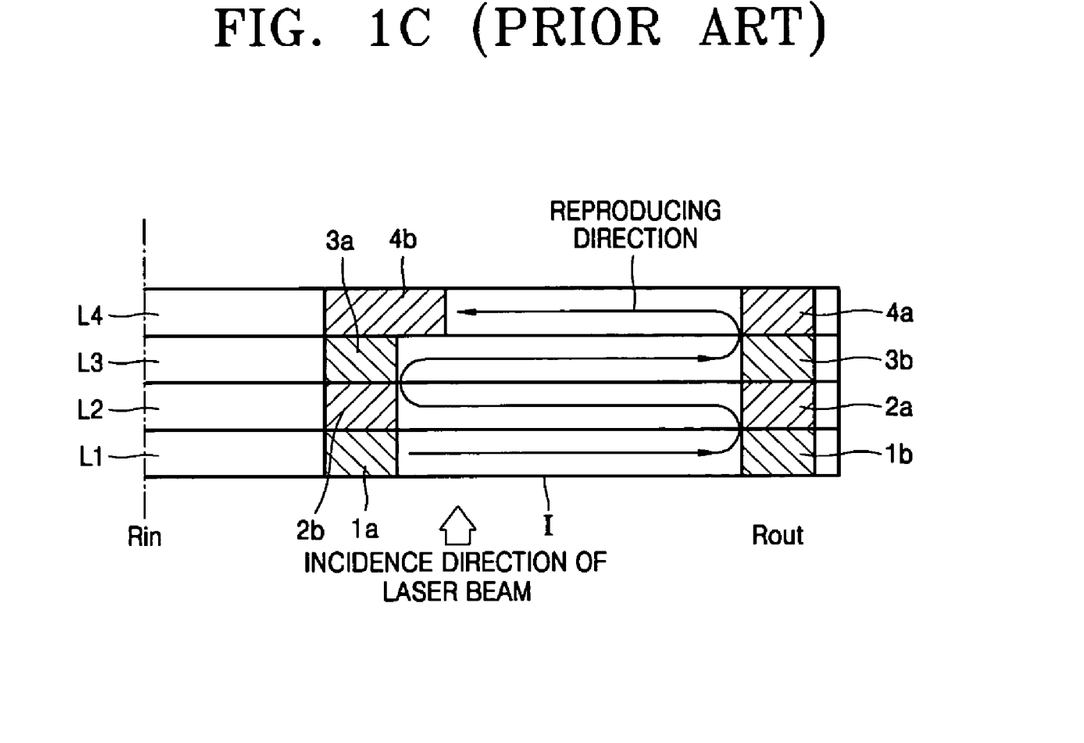
FIG. 1C illustrates the arrangement of lead-in areas and lead-out areas of a conventional OTP four-layered optical disk.

In the case of a multi-layered recordable disk, the lead-in areas 1a, 2a, 3a, and 4a and the lead-out areas 1b, 2b, 3b, and 4b include information about the disk and various conditions about recording. Accordingly, user data can be properly recorded and reproduced when reproducing the user data from the lead-in areas 1a, 2a, 3a, and 4a and the lead-out areas 1b, 2b, 3b, and 4b.

When the amount of the data to be recorded on the multi-layered information storage medium is smaller than the capacity of the information recording layers, there is an empty area on at least one information recording layer.

Figure 3A:
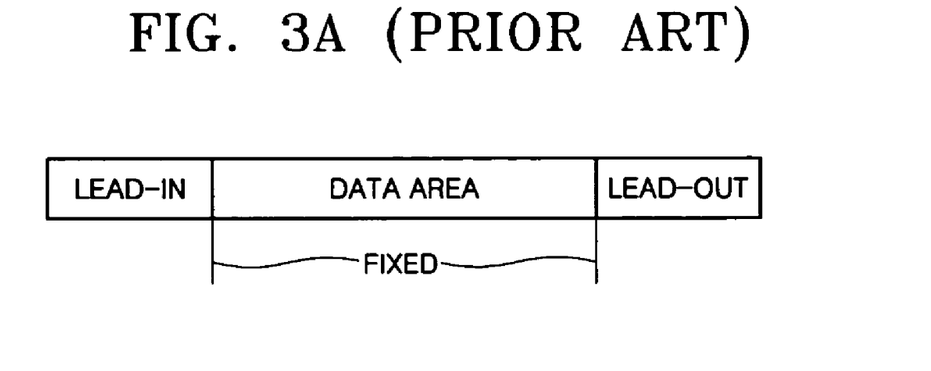
FIGS. 3A and 3B are layouts of a conventional single-layered information storage medium and a conventional dual-layered information storage medium, respectively.
Figure 3B:
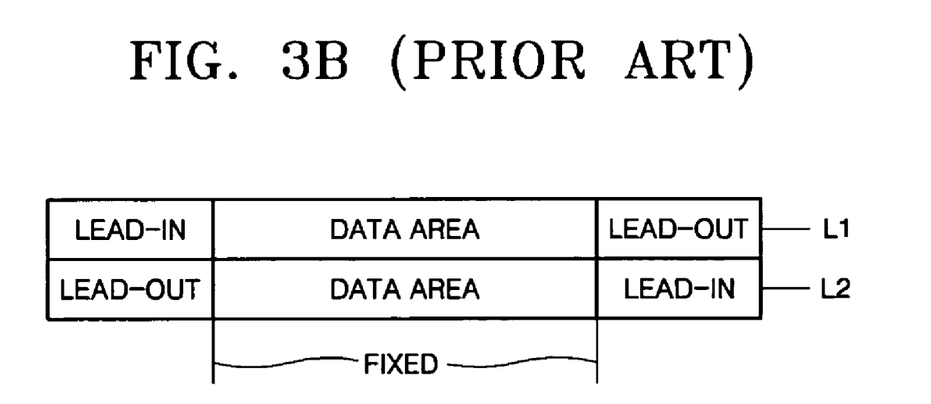

A method of processing the empty area of the information recording layer should be determined for various information storage media. FIG. 3A illustrates a single-layered recordable information storage medium, and FIG. 3B illustrates a dual layered recordable information storage medium. The locations and the capacities of lead-in areas, lead-out areas, and user data areas are fixed.

Figure 4:
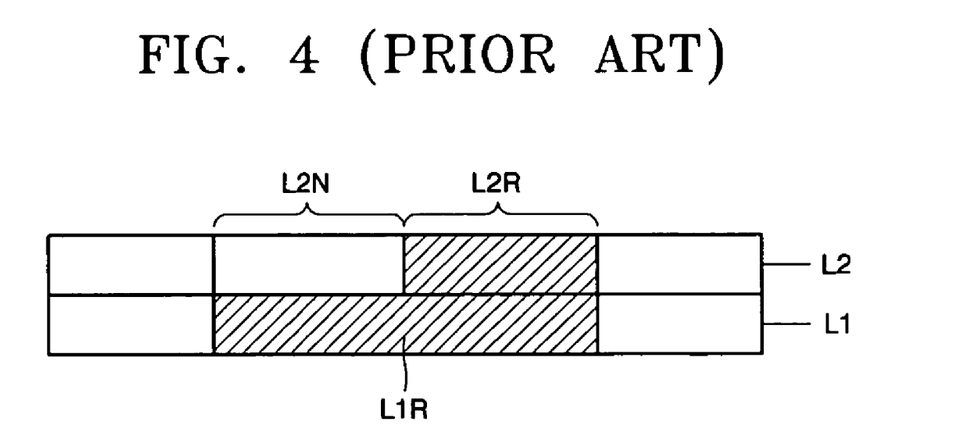
FIG. 4 illustrates regions to which a beam is input in the case where data is recorded on portions of a conventional dual-layered information storage medium.

On the other hand, the data may be recorded on the entire area of the data area of the first information recording layer L1 and on a portion of the data area of the second information recording layer L2, as shown in FIG. 4. When a beam passes through the first information recording layer L1 and the second information recording layer L2, the beam may pass through a portion L1R of the first information recording layer L1 on which the data is recorded and a portion L2N of the second information recording layer L2 on which the data is not recorded, or the beam may pass through portions L1R and L2R of the first and second information recording layers L1 and L2 on which the data is recorded. Thus, when the reproducing conditions of the areas through which the beam passes are different, a reproducing characteristic may be affected.

As described above, when determining the layout of an information storage medium, the consistency and unity with the information storage medium of a particular type should be considered and the reproducing performance of a multi-layered information storage medium should be considered. In addition, it is important to improve a recording speed according to the increase of a recording capacity.

For example, a conventional recordable DVD has a single information recording layer and a capacity of 4.7 GB. On the other hand, a conventional DVD-ROM has a capacity of 8.5 GB and dual information recording layers. However, in order to back up the data from a DVD-ROM having a capacity of 8.5 GB, a recordable DVD having the same capacity is required. In addition, a method of efficiently recording data is required to reduce a back-up time of the data.

SUMMARY OF THE INVENTION

In accordance with an aspect of the present invention, an information storage medium on which a layout structure of areas is defined to minimize a recording time and efficiently move a pickup between information recording layers, and a method of and a system recording data on the same are provided.

According to an aspect of the present invention, there is provided a recordable information storage medium having a plurality of information recording layers, wherein each of the information recording layers includes a lead-in area, a user data area, a lead-out area, and a dedicated area for use with a drive, and the amount of user data to be recorded is divided to allot the data area having the same capacity on each of the information recording layers.

In an aspect of the present invention, the location of the lead-out area varies according to the capacity of the data area.

In an aspect of the present invention, the dedicated area is arranged at the outmost perimeter of the information storage medium.

In an aspect of the present invention, when an area remains between the lead-out area and the dedicated area, data is not recorded in that area.

In an aspect of the present invention, the dedicated area is a test area, and the location of the dedicated area is fixed.

According to another aspect of the present invention, there is provided a method of recording data on a recordable information storage medium having a plurality of information recording layers, wherein each of the information recording layers includes a lead-in area, a user data area, a lead-out area, and a dedicated area for use with a drive, the method including performing a test on the dedicated area for the drive, dividing the amount of the user data to be recorded into the number of the information recording layers and recording the same amount of data on each of the information recording layers, and recording the data having a lead-out property following the data area of each of the information recording layers.

According to another aspect of the present invention, there is provided a system for recording data on a recordable information storage medium having a plurality of information recording layers, wherein each of the information recording layers includes a lead-in area, a user data area, a lead-out area, and a dedicated area for a drive, including a pickup unit radiating a beam to the information storage medium, a recording/reproducing signal process unit receiving the beam reflected on the information storage medium through the pickup unit and performing a signal process, and a control unit performing a test in the dedicated area for the drive and dividing the amount of user data to be recorded into the number of the information recording layers to record the same amount of data on each of the information recording layers.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5A:
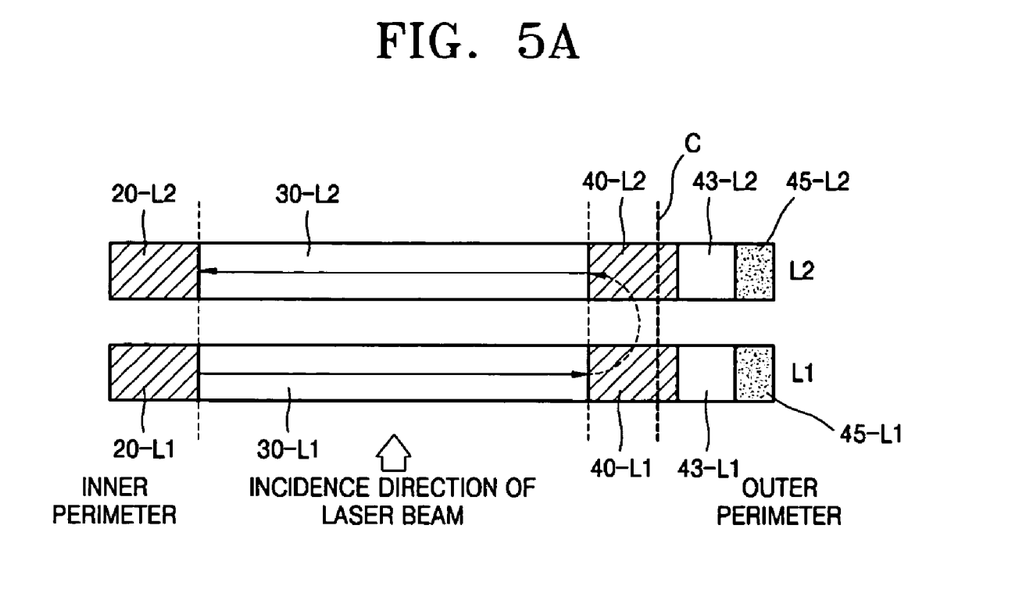
FIGS. 5A and 5B are layouts of a dual information storage medium according to an embodiment of the present invention.

An information storage medium according to an embodiment of the present invention has a plurality of information recording layers. Referring to FIG. 5A, each of the information recording layers includes a data area on which user data is recorded, and a lead-in area and a lead-out area that are arranged at an inner perimeter and an outer perimeter of the data area, respectively.

The information storage medium according to an embodiment of the present invention may be applied to a recordable information storage medium, and more efficiently, to a recordable information storage medium on which the amount of data to be recorded is determined before recording data.

When an information storage medium includes a plurality of information recording layers, the amount of data to be recorded is divided into the number of the information recording layers in order to record the same amount of data on each of the information recording layers. In other words, the capacities and the locations of the data areas and the lead-out areas may vary according to the amount of the data to be recorded.

Figure 5B:
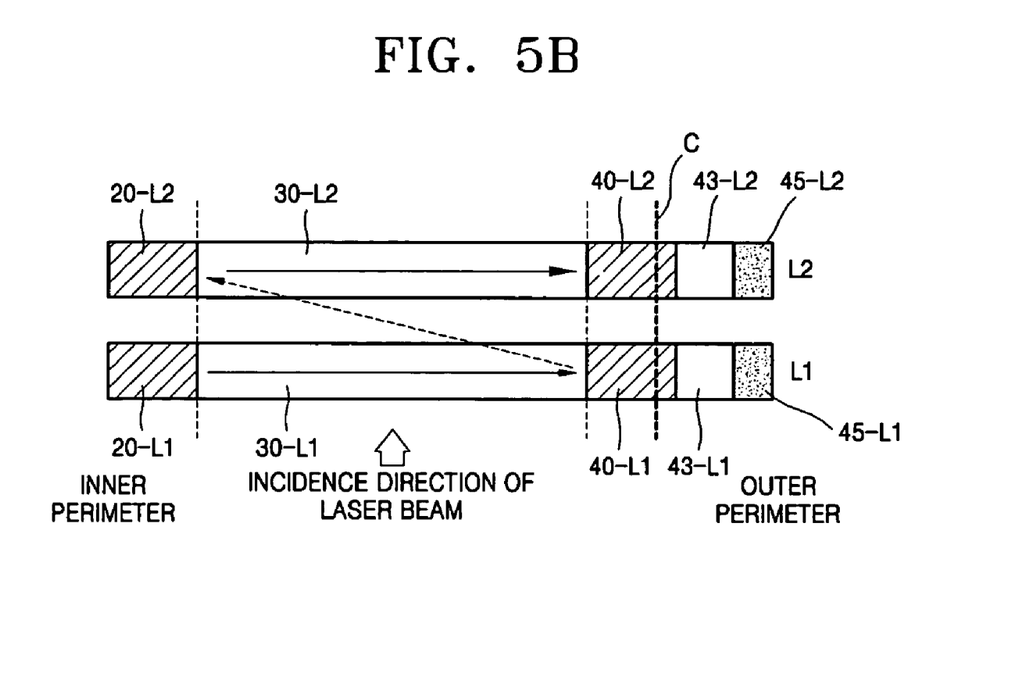

FIG. 5A illustrates an opposite track path (OTP) dual layer information storage medium, and FIG. 5B illustrates a parallel track path (PTP) dual layer information storage medium. Referring to FIG. 5A, the dual layer information storage medium includes a first information recording layer L1 and a second information recording layer L2, and the information recording layers L1 and L2 include lead-in areas 20-L1 and 20-L2, data areas 30-L1 and 30-L2, and lead-out areas 40-L1 and 40-L2, respectively. In addition, when the amount of data to be recorded is predetermined, the amount of data is divided into halves and each half is allotted to the data areas 30-L1 and 30-L2, respectively. The reference character C denotes the maximum of the user data to be recorded.

In addition, the lead-out areas 40-L1 and 40-L2 are arranged at the outer perimeters of the data areas 30-L1 and 30-L2 of the information recording layers to record the data in a pattern having a lead-out property. Thus, a location of the lead-out areas 40-L1 and 40-L2 varies depending on the amount of data recorded.

In this case, the lead-in area and the lead-out area that are located in the middle in a data recording direction may be referred to as a middle area or a connection area. In other words, the lead-out area 40-L1 of the first information recording layer L1 and the lead-out area 40-L2 of the second information recording layer L2 in FIG. 5A, and the lead-out area 40-L1 of the first information recording layer L1 and the lead-in area 20-L2 of the second information recording layer L2 may be referred to as the middle areas or the connection areas.

On the other hand, an information storage medium according to an embodiment of the present invention includes a dedicated area for use by a recording and/or reproducing apparatus (hereinafter referred to as a drive) in order for the drive to read recording information before recording user data. The dedicated area may include, for example, a test area for performing a test for detecting an optimum recording power of a recording medium and/or an area of recording information about recording histories of the drive.

However, the test in the drive is performed before recording the user data, thus it is impossible to recognize the amount of data to be recorded. Therefore, the drive cannot determine the location of performing the test. As a result, the location of a test area should be fixed.

Referring to FIGS. 5A and 5B, dedicated areas for use by a drive, for example, test areas 45-L1 and 45-L2 may be fixed at the outmost perimeter of the information recording layers L1 and L2. When an information storage medium is loaded in the drive, the drive performs tests using the test areas 45-L1 and 45-L2 and records data. Thereafter, the drive records the pattern having the lead-out property at the outer perimeter of data areas 30-L1 and 30-L2, which are set depending on the size of the data to be recorded. The lead-out property is a data pattern to prohibit a pickup from separating from an information storage medium.

In the case where an empty area exists in the test areas 40-L1 and 40-L2 when the recording of the pattern having the lead-out property is finished, the areas 43-L1 and 43-L2 between the lead-out areas 40-L1 and 40-L2 and the test areas 45-L1 and 45-L2, respectively, remain empty. Since the empty areas 43-L1 and 43-L2 are present, a recording time can be reduced compared to a case where the pattern having the lead-out property is recorded at the outmost perimeter of a recording medium. In addition, in order to efficiently move a pickup between recording layers, the recording may be performed according to an OTP type.

Figure 6A:
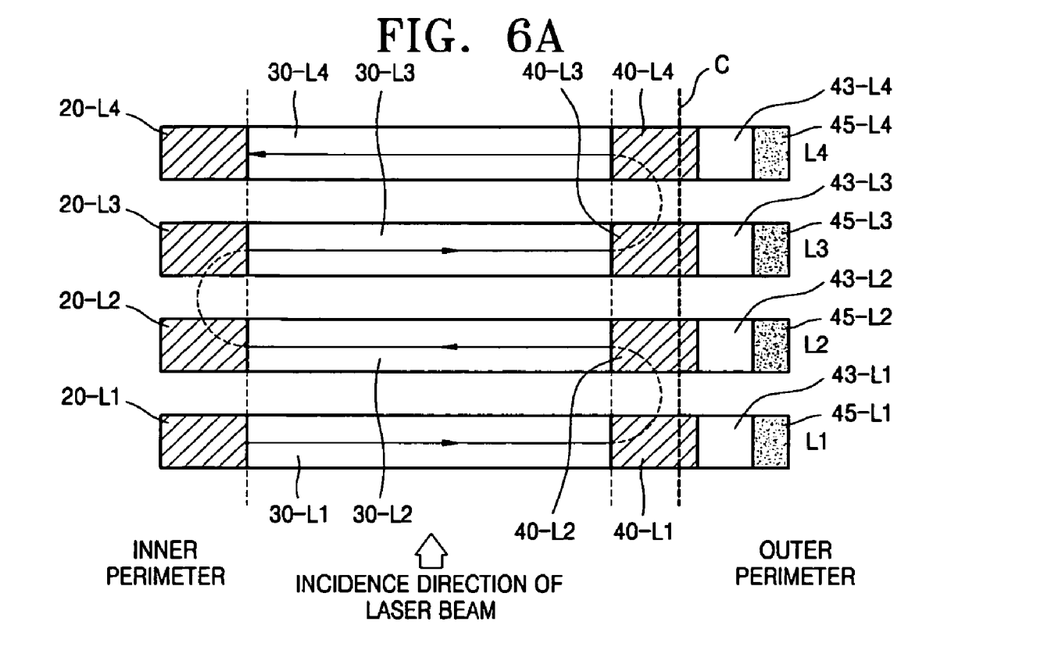
FIGS. 6A and 6B are layouts of a four-layered information storage medium according to another embodiment of the present invention.
Figure 6B:
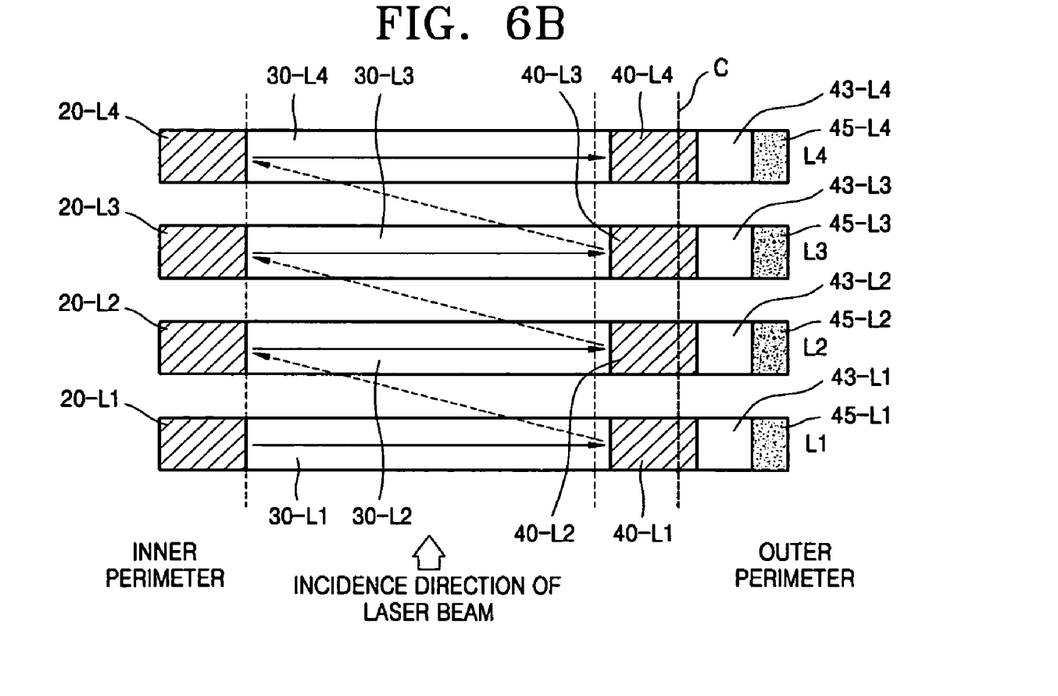

FIGS. 6A and 6B illustrate an OTP multi-layered information storage medium and a PTP multi-layered information storage medium including first through fourth information recording layers L1, L2, L3, and L4, respectively.

The first through fourth information recording layers L1, L2, L3, and L4 include lead-in areas 20-L1, 20-L2, 20-L3, and 20-L4, data areas 30-L1, 30-L2, 30-L3, and 30-L4, lead-out areas 40-L1, 40-L2, 40-L3, and 40-L4, and dedicated areas for a drive 45-L1, 45-L2, 45-L3, and 45-L4, respectively.

The amount of data to be recorded is divided to be approximately equally distributed among the data areas 30-L1, 30-L2, 30-L3, and 30-L4 each having the same capacity that are formed on the first through fourth information recording layers L1, L2, L3, and L4, respectively. In addition, the lead-out areas 40-L1, 40-L2, 40-L3, and 40-L4 are arranged following the data areas 30-L1, 30-L2, 30-L3, and 30-L4 on which the user data is recorded. The reference character C designates a maximum amount of user data that may be recorded. The pattern having a lead-out property is recorded on the lead-out areas 40-L1, 40-L2, 40-L3, and 40-L4.

The dedicated areas 45-L1, 45-L2, 45-L3, and 45-L4 may be arranged at the outmost perimeter of the information recording layers L1, L2, L3, and L4. When areas remain between the lead-out areas 40-L1, 40-L2, 40-L3, and 40-L4 and the dedicated areas 45-L1, 45-L2, 45-L3, and 45-L4, these areas are empty 43-L1, 43-L2, 43-L3 and 43-L4.

Figure 7:
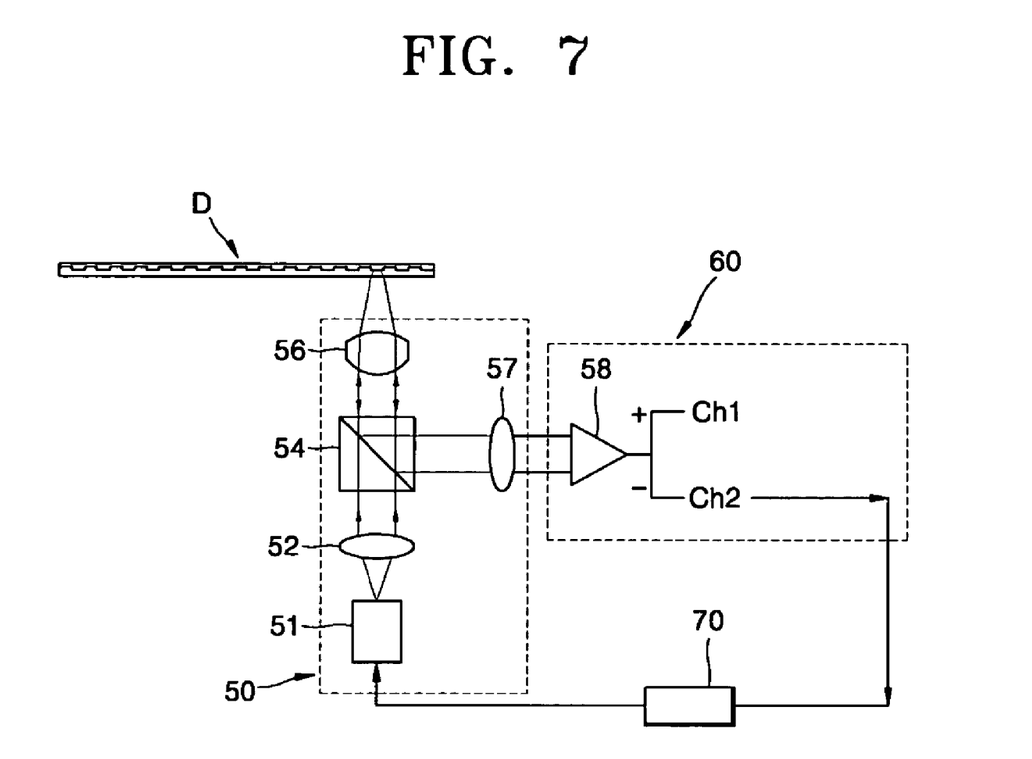
FIG. 7 illustrates a system of recording and/or reproducing data on/from an information storage medium according to an embodiment of the present invention.

FIG. 7 illustrates a system recording/reproducing data on/from an information storage medium according to an embodiment of the present invention.

A system recording/reproducing data includes a pickup unit 50, a recording/reproducing signal process unit 60, and a control unit 70. More specifically, the system includes a laser diode 51 of radiating a beam, a collimating lens 52 of collimating the beam radiated from the laser diode 51, a beam splitter 54 of converting the path of the incidence beam, and an objective lens 56 of concentrating the beam from the beam splitter 54 on an information storage medium D.

The beam reflected from the information storage medium D is reflected on the beam splitter 54 and received by an optical detector, for example, a quadrant optical detector 57. The beam received by the optical detector 57 is converted into electric signals by passing through an operation circuit unit 58 and output as RF signals, In other words, channel Ch1 detects a sum of signals and differential signal channel Ch2 detects push-pull signals.

Referring to FIG. 5A, by way of example, the control unit 70 performs a test in test areas 45-L1 and 45-L2 of the information storage medium D before recording data on the information storage medium D. In addition, the control unit 70 records approximately the same amount of user data on each of the information recording layers L1 and L2 of the information storage medium D. The control unit 70 controls the pickup unit 50 to radiate a recording beam of a proper power, which is obtained by the test, to record the user data on the information storage medium D. When the recording of the user data is finished, the pattern of a lead-out property is recorded in at least one of the lead-out areas 40-L1 or 40-L2.

In addition, when areas 43-L1 and 43-L2 remain between the data areas and the test areas 45-L1 and 45-L2, the control unit 70 finishes the recording without recording data on the areas 43-L1 and 43-L2 (i.e., the areas are left empty).

In order to reproduce the data from the information storage medium D, a beam reflected from the information storage medium D is input to the optical detector 57 by passing through the objective lens 56 and the beam splitter 54. The signals input to the optical detector 57 are converted into electric signals by the operation circuit unit 58 and output as RF signals.

A method of recording data according to aspects of the present invention recognizes the amount of data to be recorded on an information storage medium when the information storage medium is loaded on a drive, and performs a test on a dedicated area for the drive, for example, a test area of the information storage medium. Thereafter, the amount of the data is divided to allot data areas having approximately the same amount on each of information recording layers. Then, the data is recorded based on the allotted amount of data, and the data having a lead-out property is recorded following the data areas on the information recording layers.

On the other hand, when areas remain between the lead-out areas and the dedicated areas for the drive, these areas are empty.

As described above, an information storage medium according to aspects of the present invention provides a physical layout of a recordable information storage medium. The information storage medium according to aspects of the present invention includes a plurality of information recording layers having lead-in areas, data areas, and lead-out areas, and the data areas are allotted to record approximately the same amount of data on each of the information recording layers. In addition, a layout for remaining areas after the recording of the data is provided to minimize a data recording time.

Furthermore, a method and a system of recording data according to embodiments of the present invention may efficiently record data on an information storage medium.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for reproducing user data from a storage medium having a plurality of recording layers, each recording layer including a lead-in area, a user data area, a lead-out area, and a dedicated area, the method comprising:
   reproducing the user data from the data areas of the recording layers,
   wherein an amount of the user data on the recording layers is less than a total capacity of the user data areas, and was equally divided among the user data areas during recording such that each user data area has an equal amount of the user data, capacities of the user data areas vary equally according to the amount of the user data that is recorded, and
   each of the recording layers includes an unrecorded area, where user data is unrecorded, between the lead-out area and the dedicated area, and each unrecorded area has an approximately equal capacity and is positioned at the same radial position of the each recording layer.

2. The method of claim 1, wherein a location of each lead-out area on each recording layer varies according to the capacity of the corresponding user data area.

3. The method of claim 1, wherein the dedicated area is arranged on each recording layer at an outmost perimeter of the storage medium.

4. The method of claim 1, wherein each dedicated area is a test area, and a location of each dedicated area is fixed on each recording layer.

5. The method of claim 1, each dedicated area is arranged at an outmost perimeter of each recording layer.

6. A method for reproducing user data from a storage medium, comprising:
   reading the user data from recording layers of a storage medium, each recording layer including a lead-in area, a user data area, a lead-out area, and a dedicated area; and
   controlling reading of the user data from the user data areas on the recording layers, wherein an amount of the user data being reproduced is less than a capacity of the user data areas and was equally divided among the user data areas during recording such that each of the user data areas has an approximately equal amount of the data on each recording layer, capacities of the user data areas vary equally according to the amount of the user data that is recorded, and
   each of the recording layers includes an unrecorded area, where user data is unrecorded, between the lead-out area and the dedicated area, and each unrecorded area has an approximately equal capacity and is positioned at the same radial position of the each recording layer.

7. The method of claim 6, wherein a location of each lead-out area on each recording layer varies according to the capacity of the corresponding user data area.

8. The method of claim 6, wherein each dedicated area is arranged at an outmost perimeter of the storage medium.

9. The method of claim 6, wherein the dedicated area is a test area, and a location of each dedicated area is fixed on the recording layer.

10. The method of claim 6, wherein each dedicated area is arranged at an outmost perimeter of each recording layer.

11. A method of reproducing user data from a storage medium having a plurality of recording layers, each recording layer including a lead-in area, a user data area, a lead-out area, and a dedicated area for use with a disk drive, the method comprising:
    reading the user data from the user data areas of the recording layers,
    wherein an amount of the user data read from the recording layers is less than a total capacity of the user data areas, as the user data was divided approximately equally among the user data areas so that an approximately equal amount of the user data was previously recorded on each recording layer, capacities of the user data areas vary equally according to the amount of the user data that is recorded, and each of the recording layers includes an unrecorded area, where user data is unrecorded, between the lead-out area and the dedicated area, and each unrecorded area has an approximately equal capacity and is positioned at the same radial position of the each recording layer.

12. The method of claim 11, wherein a location of the each lead-out area on each recording layer varies according to the capacity of the corresponding user data area.

13. The method of claim 11, wherein the dedicated area is a fixed area at an outmost perimeter of the storage medium.

* * * * *